(12) United States Patent
Drentea

(10) Patent No.: US 7,139,545 B2
(45) Date of Patent: Nov. 21, 2006

(54) ULTRA-WIDEBAND FULLY SYNTHESIZED HIGH-RESOLUTION RECEIVER AND METHOD

(75) Inventor: Cornell Drentea, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 488 days.

(21) Appl. No.: 10/459,934

(22) Filed: Jun. 12, 2003

(65) Prior Publication Data
US 2004/0253935 A1    Dec. 16, 2004

(51) Int. Cl.
*H04B 1/26* (2006.01)
*H04B 15/00* (2006.01)

(52) U.S. Cl. ............... 455/314; 455/207; 455/209; 455/315

(58) Field of Classification Search ........... 455/207, 455/209, 314, 315, 318, 324
See application file for complete search history.

(56) References Cited

U.S. PATENT DOCUMENTS

| | | | |
|---|---|---|---|
| 4,422,053 A * | 12/1983 | Brewerton et al. ........... 332/16 |
| 4,695,842 A * | 9/1987 | Jehle et al. .................... 342/59 |
| 5,307,071 A * | 4/1994 | Arnold et al. ............... 342/103 |
| 2003/0194978 A1* | 10/2003 | Vorenkamp et al. ..... 455/197.1 |
| 2005/0003785 A1* | 1/2005 | Jackson et al. ............. 455/260 |

* cited by examiner

*Primary Examiner*—Quochien B. Vuong
*Assistant Examiner*—Tuan H. Nguyen
(74) *Attorney, Agent, or Firm*—Thomas J. Finn; Leonard A. Aikov; Karl A. Vick

(57) ABSTRACT

An ultra-wideband receiver system includes an intelligent-preselector stage to up-convert received signals to signals within a first IF frequency-range with stepped first oscillation signals, a first down-converting stage to down-convert the signals within the first IF frequency-range to signals within a second IF frequency-range with a fixed second oscillation signal, and a second down-converting stage to down-convert the signals within the second IF frequency-range to signals within a third IF frequency-range with stepped third oscillation signals. The center frequency of the first IF frequency-range may be at least 30% to 35% higher than a highest frequency in the receive-frequency range to provide an image frequency far from (e.g., more than twice) the highest frequency in the receive-frequency range. The receiver may also include a synthesizer to generate the first, second and third oscillation signals with half-integer frequency dividers based on a master reference signal.

33 Claims, 5 Drawing Sheets

US 7,139,545 B2

ULTRA-WIDEBAND FULLY SYNTHESIZED HIGH-RESOLUTION RECEIVER AND METHOD

TECHNICAL FIELD

Embodiments of the present invention pertain to wireless communications and in particular, to wideband receivers and high-resolution wideband receivers.

BACKGROUND

Many conventional wideband receivers initially down-convert received signals from a wide frequency range to a low intermediate frequency (IF). One problem with such conventional wideband receivers is that the components required to initially down-convert to and/or process such a very low IF frequency tend to be larger, bulkier and usually heavier. This makes some wideband receivers difficult to employ in applications with size, space and/or weight limitations. Another problem with such conventional wideband receivers is that the initial down-conversion may result in an image frequency that is close to or within the receive-frequency range. These images are difficult to reject, especially in wideband applications, and usually require additional front-end circuitry, which further contributes to the size, space and/or weight of the receiver. Furthermore, such image signals may result in improper and/or false signal detection.

Thus, there are general needs for an improved wideband receiver and method at higher frequencies. There are also needs for a wideband receiver and method that is smaller, less-bulky and/or lighter that a conventional wideband receiver. There are also needs for a wideband receiver and method that may be more suitable for applications with size, space and/or weight limitations. There are also needs for a wideband receiver and method in which the image frequency is outside the receive-frequency range. There are also needs for a wideband receiver and method that may reduce improper and/or false signal detection, especially for high-resolution wideband receivers.

SUMMARY

An ultra-wideband receiver system includes an intelligent-preselector stage to up-convert received signals to signals within a first IF frequency-range with stepped first oscillation signals, a first down-converting stage to down-convert the signals within the first IF frequency-range to signals within a second IF frequency-range with a fixed second oscillation signal, and a second down-converting stage to down-convert the signals within the second IF frequency-range to signals within a third IF frequency-range with stepped third oscillation signals. The center frequency of the first IF frequency-range may be at least 30% to 35% higher than a highest frequency in the receive-frequency range to help insure proper image rejection. This may provide an image frequency far from (e.g., more than twice) the highest frequency in the receive-frequency range. The receiver may also include a synthesizer to generate the first, second and third oscillation signals based on a master reference signal. The intelligent-preselector stage may comprise half-octave filters, each to cover approximately a half-octave portion of the receive-frequency range.

The receiver may also include a system controller to provide a select command to the intelligent-preselector stage to select among a plurality of up-converting elements and to select among a plurality of half-octave filters based on a frequency of the stepped first oscillation signals. The system controller may also provide first-loop step commands to the synthesizer. The synthesizer may be responsive to the first-loop step commands to generate the stepped first oscillation signals in steps of a first increment. The system controller may also provide third-loop step commands to the synthesizer. The synthesizer may be responsive to the third-loop step commands to generate the stepped third oscillation signals in steps of a second increment, which, in some high-resolution embodiments, may be as small as 10 Hz increments providing up to a 10 Hz resolution over the entire receive-frequency range.

The synthesizer may include a master reference unit to generate the master reference signal, a first phase-locked loop to generate the stepped first oscillation signals based on the master reference signal, a second phase-locked loop to generate the fixed second oscillation signal based on the master reference signal, and a third phase-locked loop to generate the stepped third oscillation signals based on the master reference signal. The synthesizer may provide the fixed and stepped oscillation signals using half-integer frequency dividers.

In an embodiment, the receiver may include a signal identifier to identify one or more signals within a receive-frequency range of the receiver and to instruct the system controller to provide the select command, to provide the first-loop step commands and to provide the third loop step commands to convert the identified one or more signal to a signal within the third IF frequency-range. In a high-resolution embodiment, up to a 10 Hz resolution in the third IF frequency range may be obtained for signals within a 2 to 20 GHz receive-frequency range.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims.

The present invention provides an improved wideband receiver and method. In embodiments, the present invention also provides a wideband receiver and method that may be smaller, less-bulky and/or lighter that a conventional wideband receiver. In embodiments, the present invention also provides a wideband receiver and method more suitable for applications with size, space and/or weight limitations. In embodiments, the present invention also provides a wideband receiver and method in which the image frequency is far outside the receive-frequency range. In embodiments, the present invention may also provide a wideband receiver and method with reduced improper and/or false signal detection.

In embodiments, an intelligent wideband RF receiver up-converts signals with a receive-frequency range to an IF frequency which may be above the highest frequency in the receive-frequency range by up to 30% to 35% or greater. This may help minimize image-frequency problems and may reduce the size, space and/or weight of the receiver. In embodiments, the receiver includes a switchable half-octave front end and a unique synthesizer which provides fixed and stepped oscillation signals using half-integer frequency dividers.

Figure 1:
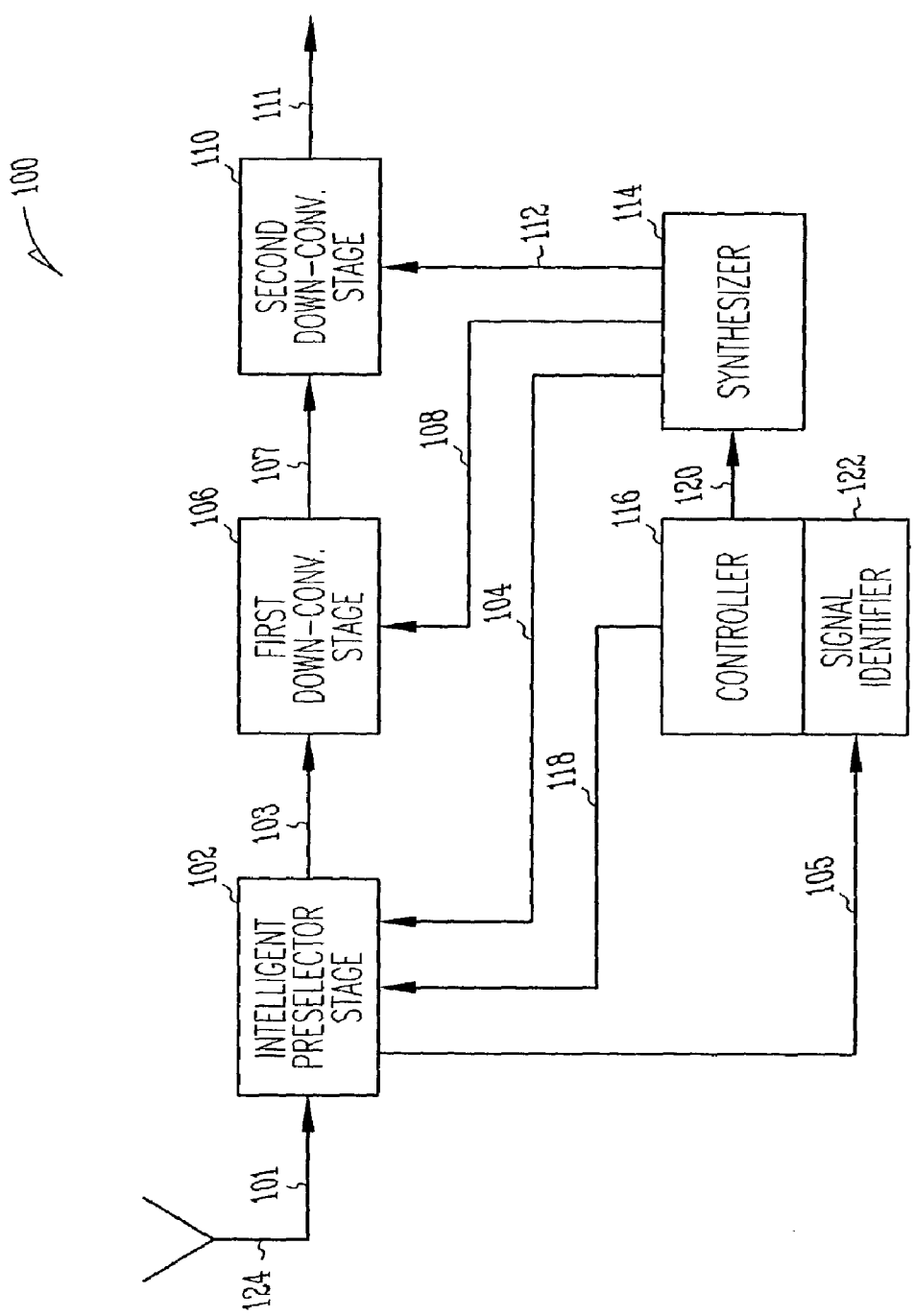
FIG. 1 is a functional block diagram of a receiver system in accordance with embodiments of the present invention.

FIG. 1 is a functional block diagram of a receiver system in accordance with embodiments of the present invention. Receiver system 100 includes intelligent-preselector stage 102 to up-convert received signals 101 to signals 103 within a first IF frequency-range with stepped first oscillation signals 104. Receiver system 100 may also include first down-converting stage 106 to down-convert signals 103 within the first IF frequency-range to signals 107 within a second IF frequency-range with fixed second oscillation signal 108. Receiver system 100 may also include second down-converting stage 110 to down-convert signals 107 within the second IF frequency-range to signals 111 within a third IF frequency-range with stepped third oscillation signals 112. Receiver system 100 may also include synthesizer 114 to generate the first, second and third oscillation signals based on a master reference signal. In embodiments, intelligent-preselector stage 102 up-converts received signals within a receive-frequency range and a center frequency of the first IF frequency-range may be at least approximately 30% to 35% higher than a highest frequency in the receive-frequency range. This provides an image frequency that is far away (e.g., more than twice the highest frequency) from the receive-frequency range.

Receiver system 100 may also include system controller 116 to provide select command 118 to intelligent-preselector stage 102 to select among a plurality of up-converting elements and/or to select among a plurality of half-octave filters depending on a frequency of stepped first oscillation signals 104. System controller 116 may also provide other commands 120 to instruct synthesizer 114 to step and/or provide oscillation signals 104, 108 and 112. In embodiments, controller 116 may provide first-loop step commands to synthesizer 114. In response to the first-loop step commands, synthesizer 114 may generate stepped first oscillation signals 104, which may be in steps of a first increment. In embodiments, controller 116 may also provide third-loop step commands to synthesizer 114. In response to the third-loop step commands, synthesizer 114 may generate stepped third oscillation signals 112 in steps of a second increment.

In one embodiment, receiver system 100 may include signal identifier 122 to identify one or more signals within the receive-frequency range of receiver system 100 and may instruct the system controller to provide select command 118, and to provide the first-loop and the third loop step commands to convert the identified one or more signals to a signal within the third IF frequency-range. In embodiments, synthesizer 114 may provide for a sweep over the receive-frequency range so that signal identifier may identify signals. Preselector stage 102 may provide coupled signals 105 to signal identifier 122 for use in identifying signals in the receive-frequency range.

In embodiments, synthesizer 114 may include a master reference unit to generate the master reference signal, a first phase-locked loop to generate the stepped first oscillation signals based on the master reference signal, a second phase-locked loop to generate the fixed second oscillation signal based on the master reference signal, and a third phase-locked loop to generate the stepped third oscillation signals based on the master reference signal. In some embodiments, the first phase-locked loop may generate stepped first oscillation signals 104 in steps of a first increment to allow intelligent-preselector stage 102 to up-convert signals 101 within the receive-frequency range to signals 103 within the first IF frequency-range. In these embodiments, the first IF frequency-range may have a first bandwidth of approximately the first increment. In some embodiments, the second phase-locked loop may generate fixed second oscillation signal 108 to allow first down-converting stage 106 to down-convert signals 103 within the first IF frequency-range to signals 107 within the second IF frequency-range. In embodiments, the first and second IF frequency-ranges may have a first bandwidth. In some embodiments, the third phase-locked loop may generate stepped third oscillation signals 112 in steps of a second predetermined increment to allow second down-converting stage 110 to down-convert signals 107 within the second IF frequency-range to signals 111 within the third IF frequency-range. In embodiments, the second IF frequency-range may have the first bandwidth, the third IF frequency may have a second bandwidth.

Antenna 124 may comprise a phased-array antenna, a directional or omni-directional antenna, including, for example, a dipole antenna, a monopole antenna, a loop antenna, a microstrip antenna or other type of antenna suitable for reception and/or transmission of RF signals in the receive-frequency range by receiver system 100. In embodiments, receiver system 100 may part of almost any wireless communication device.

In one high-resolution embodiment, the receive-frequency range of receiver system 100 may range from approximately 2 to 20 GHz. In this embodiment, the stepped first oscillation signals may range from approximately 6 to 24 GHz and may be provided by the synthesizer in steps generated by a half-integer divider. In this embodiment, the first IF frequency-range may have a center frequency of approximately 26 GHz and may have a first bandwidth of approximately 0.5 GHz. In this embodiment, the image frequency may be at approximately 52 GHz. In this embodiment, the fixed second oscillation signal may be approximately 24.5 GHz, and the second IF frequency-range may have a center frequency of approximately 1.5 GHz and may have the first bandwidth. In this embodiment, the stepped third oscillator signals may range from approximately 0.75 GHz to 1.25 GHz and may be provided by the synthesizer in steps of approximately 10 Hz increments. In this embodiment, the third IF frequency-range may have a center frequency of approximately 0.5 GHz and may range from approximately 0.250 and 0.750 GHz. This range may be stepped through twice. The third IF frequency may be provided by the second down-converting stage in steps of 10 Hz increments for high-resolution.

Although receiver system 100 is illustrated as having several separate functional elements, one or more of the functional elements may be combined and may be implemented by combinations of software-configured elements, such as processing elements including digital signal processors (DSPs), and/or other hardware elements.

Figure 2:
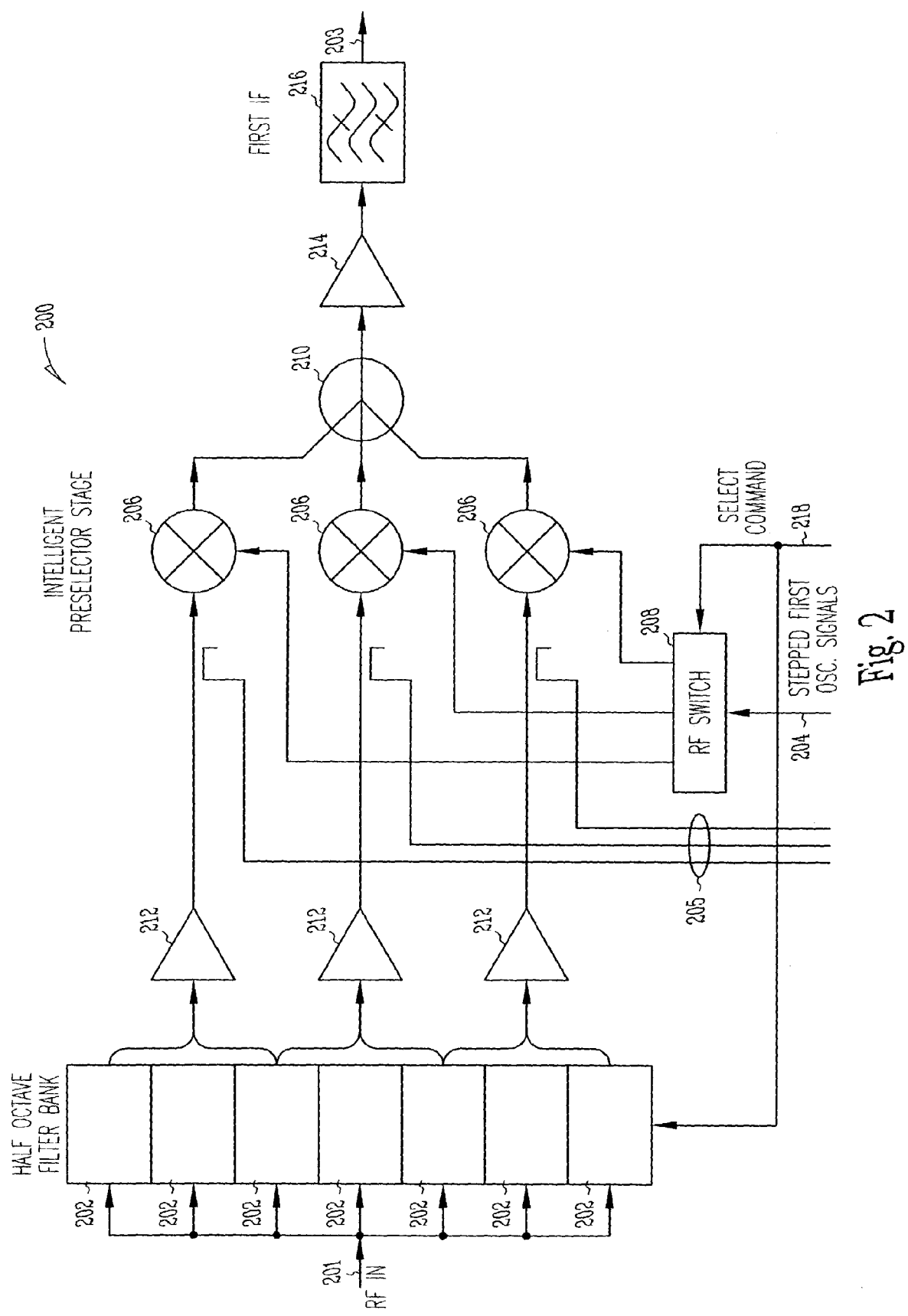
FIG. 2 is a functional block diagram of an intelligent-preselector stage in accordance with embodiments of the present invention.

FIG. 2 is a functional block diagram of an intelligent-preselector stage in accordance with embodiments of the present invention. Intelligent-preselector stage 200 may be suitable for use as intelligent-preselector stage 102 (FIG. 1) although other preselector stages may also be suitable. Intelligent-preselector stage 200 may up-convert received signals 201 within a receive-frequency range to signals 204 within a first IF frequency-range. In embodiments, a center frequency of the first IF frequency-range may be at least approximately 30% to 35% higher than a highest frequency in the receive-frequency range. Intelligent-preselector stage 200 may include a plurality of half-octave filters 202 to form a filter bank. Each half-octave filter may cover at least a half-octave portion of the receive-frequency range. In some embodiments, at least some of the half-octave filters, such as the upper-band filters, may, for example, comprise printed-resonant filters and at least some others of the half-octave filters, such as the lower-band filters, may, for example, comprise lumped element filters to help reduce passage of harmonic frequencies. Other types of filters may also be suitable.

Intelligent-preselector stage 200 may also include a plurality of up-converting elements 206 to receive filtered signals in the receive-frequency range from filters 202. Each up-converting element 206 may up-convert a portion of the receive-frequency range with stepped first oscillation signals 204. In embodiments, up-converting elements 206 may comprise broadband mixers.

Intelligent-preselector stage may also include RF switching element 208 to switch stepped first oscillation signals 204 among the plurality of up-converting elements 206 in response to select command 218. Select command 218 may also select at least some of the half-octave filters. A synthesizer, such as synthesizer 114 (FIG. 1) may generate stepped first oscillation signals 204 in steps of a first increment to allow up-converting elements 206 to up-convert signals in the receive-frequency range to signals 203 within the first IF frequency-range. In embodiments, the first IF frequency-range may have a first bandwidth approximately equal to the first increment. In embodiments, RF switching element 208 may comprise field-effect transistor (FET) switching elements, PIN-diode switching elements or micro-miniature electro-static mechanical switching (MEMS) elements.

Intelligent-preselector stage 200 may also include combining element 210 to combine and/or multiplex the outputs from up-converting elements 206. Intelligent-preselector stage 200 may also include pre-amplifiers 212 to amplify signals in the receive-frequency range for up-converting elements 206. Intelligent-preselector stage 200 may also include output amplifier 214 to amplify at least signals in the first IF frequency-range generated by up-converting elements 206. Intelligent-preselector stage 200 may also include first IF filter 216 to receive output signals from output amplifier 214. In embodiments, first IF filter 216 may have at least approximately the first bandwidth and may pass signals within at least the first IF frequency-range. In embodiments, preselector stage 200 may provide signals within the first IF frequency-range with at least 50 dB image rejection. In embodiments, preselector stage 200 may include couplers to couple signals 205 from outputs of filters 202 and/or amplifiers 212 for use by a signal identifier, such as signal identifier 122 (FIG. 1).

Figure 3:
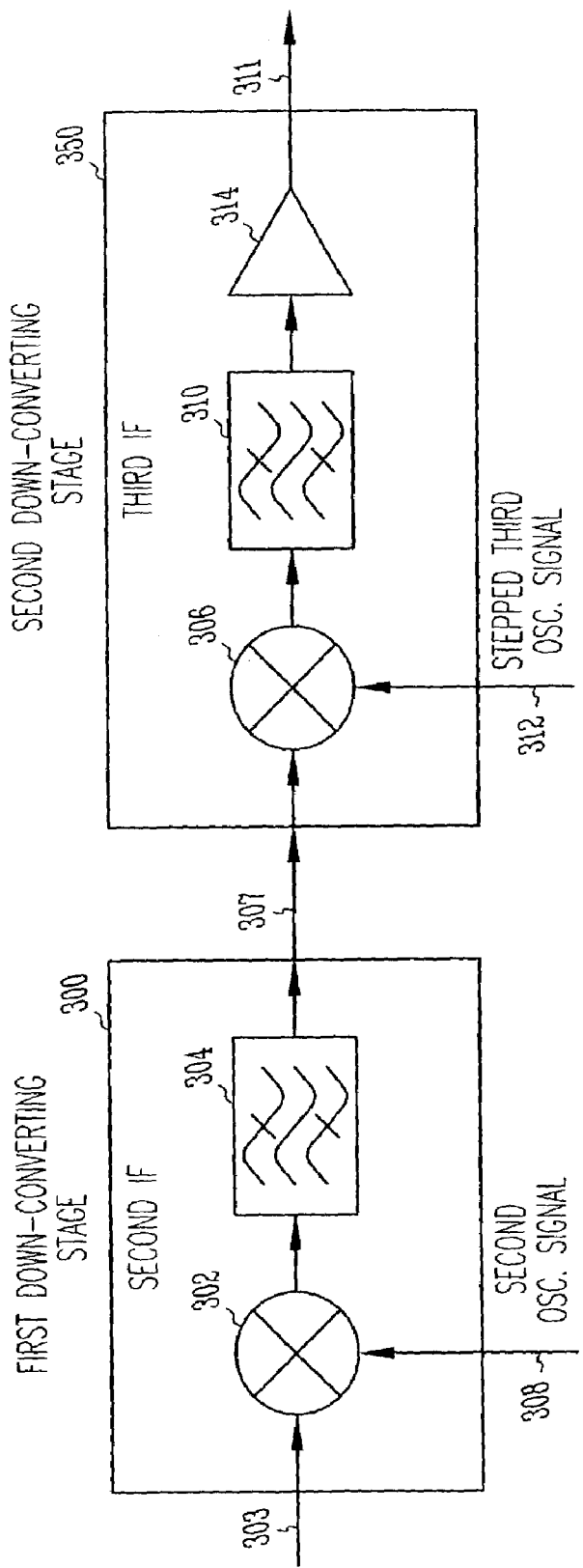
FIG. 3 is a functional block diagram of first and second down-converting stages in accordance with embodiments of the present invention.

FIG. 3 is a functional block diagram of first and second down-converting stages in accordance with embodiments of the present invention. First down-converting stage 300 maybe suitable for use as first down-converting stage 106 (FIG. 1), although other down-converting stages may also be suitable. Second down-converting stage 350 may be suitable for use as second down-converting stage 110 (FIG. 1), although other down-converting stages may also be suitable.

In embodiments, first down-converting stage 300 may include second IF mixing element 302 to down-convert signals 303 within a first IF frequency-range to signals 307 within a second IF frequency-range with fixed second oscillation signal 308. In embodiments, the first and second IF frequency-ranges may have a first bandwidth. First down-converting stage 300 may also include second IF filter 304 which may have approximately the first bandwidth to at least pass signals 307 within the second IF frequency-range provided by second IF mixing element 302.

Second down-converting stage 350 may include third IF mixing element 306 to down-convert signals 307 within the second IF frequency-range to signals 311 within the third IF frequency-range with stepped third oscillation signals 312. In embodiments, the third IF frequency-range may have a second bandwidth. Second down-converting stage 350 may also include third IF filter 310 having approximately the first bandwidth to at least pass signals 311 within the third IF frequency-range provided by third IF mixing element 306. Second down-converting stage 350 may also include output amplifier 314 to amplify signals 311 in the third IF frequency-range. In embodiments, signals 303, 307, 308, 311 and 312 may correspond respectively to signals 103, 107, 108, 111 and 112 (FIG. 1).

Figure 4:
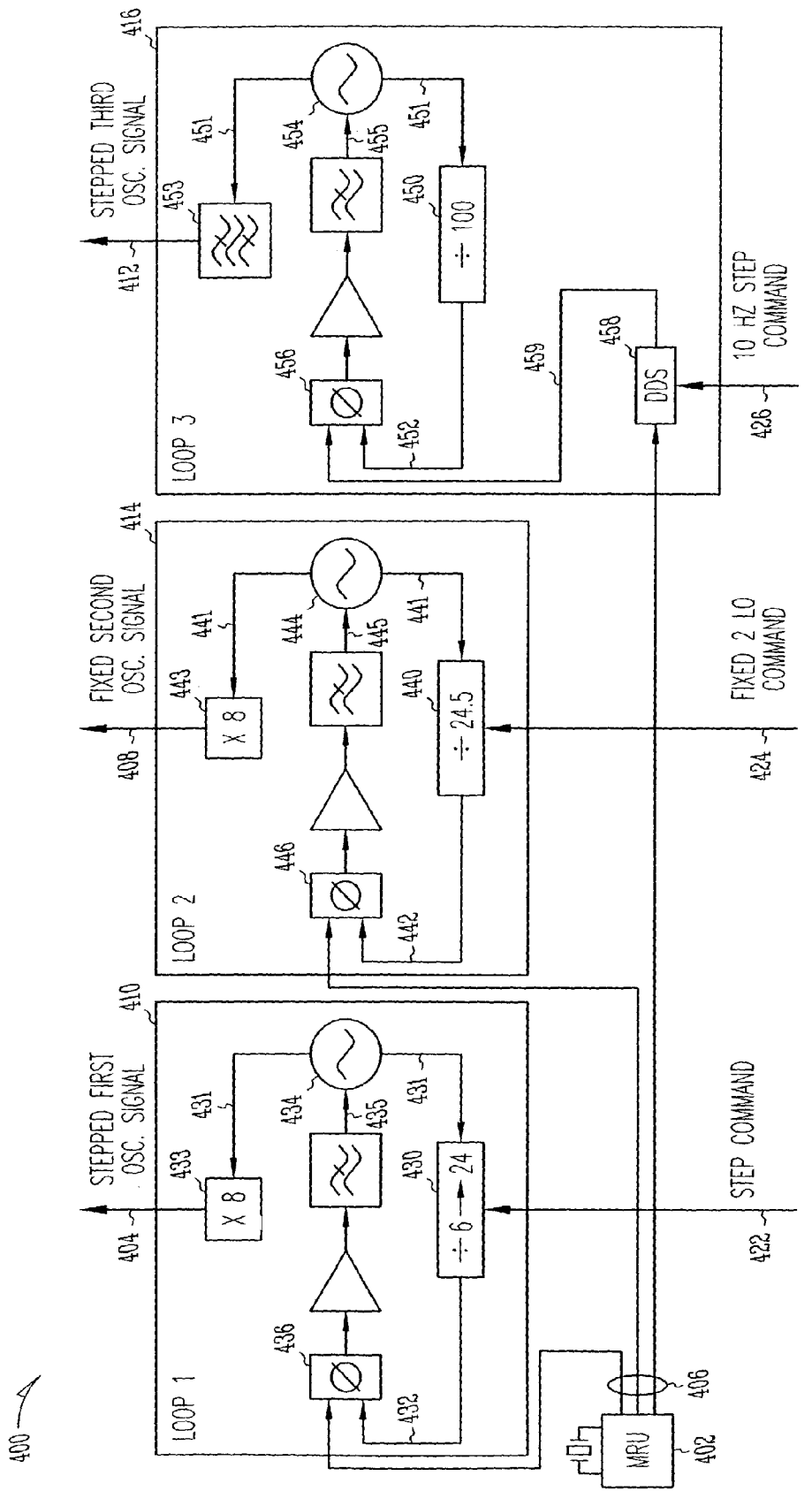
FIG. 4 is a functional block diagram of a synthesizer in accordance with embodiments of the present invention.

FIG. 4 is a functional block diagram of a synthesizer in accordance with embodiments of the present invention. Synthesizer 400 may be suitable for use a synthesizer 114 (FIG. 1) although other synthesizers may also be suitable. Synthesizer 400 generates stepped first oscillation signals 404, fixed second oscillation signal 408, and stepped third oscillation signals 412. In embodiments, signals 404, 408 and 412 may correspond respectively to signals 104, 108 and 112 (FIG. 1). Synthesizer 400 may include master reference unit (MRU) 402 to generate master reference signal 406.

In embodiments, synthesizer 400 may also include first phase-locked loop 410 to generate stepped first oscillation signals 404 based on master reference signal 406 and first-loop step commands 422. Synthesizer 400 may also include second phase-locked loop 414 to generate fixed second oscillation signal 408 based on master reference signal 406 and second-loop commands 424. Synthesizer 400 may also include third phase-locked loop 416 to generate stepped third oscillation signals 412 based on master reference signal 406 and third-loop step commands 426. First-loop step commands 422, second loop commands 424 and third-loop step commands 426 may be provided by a system controller, such as system controller 116 (FIG. 1).

In embodiments, first phase-locked loop 404 may generate stepped first oscillation signals 404 in steps of a first increment to allow an intelligent-preselector stage to up-convert signals within a receive-frequency range to signals within a first IF frequency-range. In this embodiment, the first IF frequency-range may have a first bandwidth of approximately the first increment.

First phase-locked loop 410 may include first-loop frequency divider 430 to divide first-loop VCO oscillation frequency 431 by a value to generate first-loop feedback signal 432. The value may be in half-integer increments, and in one embodiment, may be between 6 and 24 inclusive in half integer increments. First phase-locked loop 410 may also include first-loop frequency multiplier 433 to multiply first-loop VCO oscillation frequency 431 by a predetermined integer value to generate stepped first oscillation signals 404. First phase-locked loop 410 may also include first-loop VCO 434 to generate first-loop VCO oscillation frequency 431 in response to first-loop VCO control signal 435. First phase-locked loop 410 may also include first-loop phase detector 436 to compare master reference signal 406 with first-loop feedback signal 432 and generate first-loop VCO control signal 435. In embodiments, the value for frequency divider 430 in half-integer increments may be responsive to first-loop step commands 422.

Second phase-locked loop 414 generates fixed second oscillation signal 408 to allow a first down-converting stage to down-convert signals within a first IF frequency-range to signals within a second IF frequency-range. Second phase-locked loop 414 may include second-loop frequency divider 440 to divide second-loop VCO oscillation frequency 441 by an integer-and-a-half value to generate second-loop feedback signal 442. Second phase-locked loop 414 may also include second-loop frequency multiplier 443 to multiply second-loop VCO oscillation frequency 441 by a predetermined integer value to generate fixed second oscillation signal 408. Second phase-locked loop 414 may also include second-loop VCO 444 to generate second-loop VCO oscillation frequency 441 in response to second-loop VCO control signal 445. Second phase-locked loop 414 may also include second-loop phase detector 446 to compare master reference signal 406 with second-loop feedback signal 442 and generate second-loop VCO control signal 445. Second-loop commands 424 may instruct second-loop frequency divider 440 to divide by a predetermined integer-and-a-half value.

Third phase-locked loop 416 generates stepped third oscillation signals 412 in steps of a second predetermined increment (e.g., 10 Hz) to allow a second down-converting stage to down-convert signals within a second IF frequency-range to signals within a third IF frequency-range. Third phase-locked loop 416 may include third-loop frequency divider 450 to divide stepped third oscillation signals 451 by a predetermined integer value (e.g., 100) to generate third-loop feedback signal 452. Third phase-locked loop 416 may also include programmable divider element 458 to divide master reference signal 406 in response to third-loop step commands 426 to generate stepped reference signal 459. Stepped reference signal 459 may allow third phase-locked loop 416 to generate stepped third oscillation signals 412.

In embodiments, divider element 458 may be a direct digital synthesis (DDS) element and loop 416 may operate as a DDS-driven PLL. In this embodiment, element 458 may generate frequencies in fractional-hertz steps. In one example embodiment, element 458 may generate frequencies from 7.5 MHz to 12.5 MHz in 0.1 Hz steps.

Third phase-locked loop 416 may also include third-loop VCO 454 to generate stepped third oscillation signals 451 in response to third-loop VCO control signal 455. Third phase-locked loop 416 may also include third-loop phase detector 456 to compare stepped reference signal 459 with third-loop feedback signal 452 and generate third-loop VCO control signal 455. Third phase-locked loop 416 may also include output filtering element 453 to filter stepped third oscillation signals 412. Filtering element 453 may help remove spurious out-of-band signals.

Some examples of half-integer frequency dividers and divider elements suitable for use as frequency dividers 430 and 440 and divider element 450 may be found in U.S. Pat. Nos. 4,975,931 and 5,307,071. Other frequency dividers and divider elements may also be suitable for use as frequency dividers 430 and 440 and divider element 450.

Figure 5:
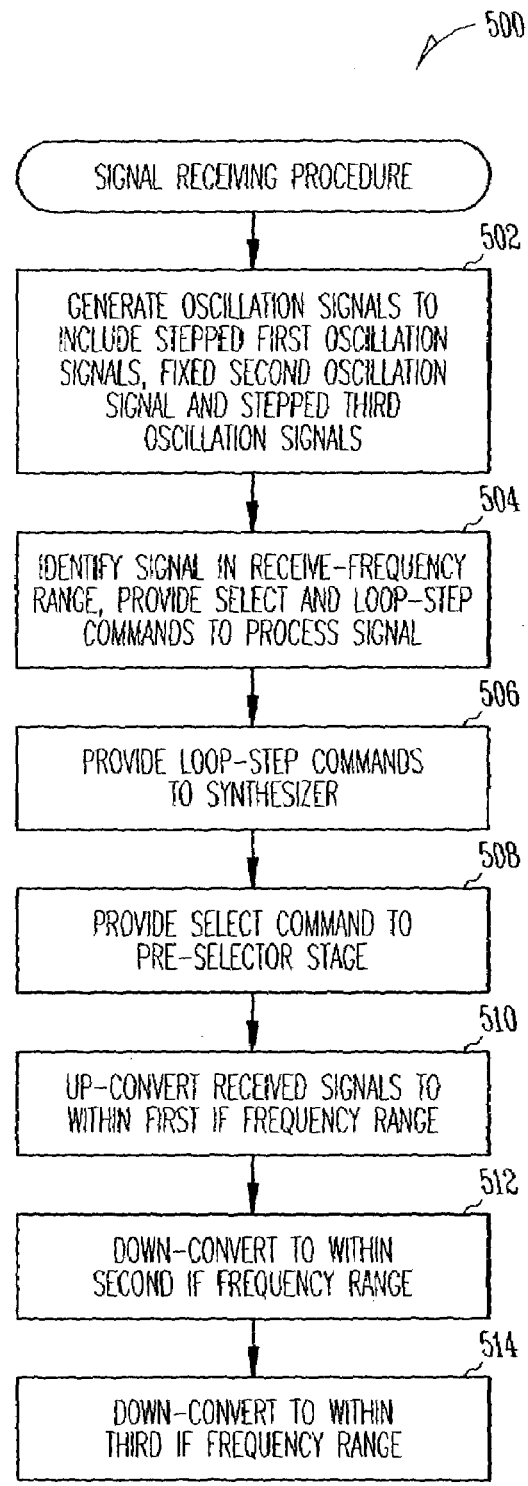
FIG. 5 is a flow chart of a signal receiving procedure in accordance with embodiments of the present invention.

FIG. 5 is a flow chart of a signal receiving procedure in accordance with embodiments of the present invention. Signal receiving procedure 500 may be performed by a receiver system, such as receiver system 100 (FIG. 1) although other receivers may also be suitable for performing procedure 500. In high-resolution wideband embodiments, procedure 500 may be suitable for receiving signals within a receive-frequency range of 2 to 20 GHz and greater with up to a 10 Hz resolution.

In operation 502, a plurality of oscillation signals may be generated from a master reference signal. The oscillation signals may include stepped first oscillation signals, a fixed second oscillation signal, and third stepped oscillation signals.

In operation 504, a signal within the receive-frequency range may be identified, and a system controller may be instructed to provide the select command, to provide the first-loop step commands and to provide the third loop step commands.

In operation 506, first-loop step commands may be provided for use in generating the stepped first oscillation signals in operation 502 in steps of a first increment. Operation 506 may also include providing third-loop step commands to generate the stepped third oscillation signals in operation 502 in steps of a second increment.

In operation 508, a select command may be provided to select among a plurality of up-converting elements based on a frequency of the stepped first oscillation signals. Operation 508 may be performed in conjunction with operation 510 to select a range of frequencies to up convert. Operations 506 and 508 may allow the identified signal to be converted to the third IF frequency-range for further processing and/or analysis.

In operation 510, received signals are up-converted to signals within a first IF frequency-range with the stepped first oscillation signals generated in operation 502. A center frequency of the first IF frequency-range may be at least approximately 30% to 35% higher than a highest frequency in a receive-frequency range for up-converting.

In operation 512, the signals within the first IF frequency-range are down-converted to signals within a second IF frequency-range with the fixed second oscillation signal generated in operation 502.

In operation 514, the signals within the second IF frequency-range are down-converted to signals within a third IF frequency-range with stepped third oscillation signals generated in operation 502.

In embodiments, operation 502 may include generating the stepped first oscillation signals in steps of a first increment to up-convert signals in the receive-frequency range to the first IF frequency-range. The first IF frequency-range may have a first bandwidth of approximately the first increment. Operation 502 may also include dividing a first-loop VCO oscillation frequency by a value to generate a first-loop feedback signal. The value may be in half-integer increments. Operation 502 may also include multiplying the first-loop VCO oscillation frequency by a predetermined integer value to generate the stepped first oscillation signals.

Operation 502 may also include generating the fixed second oscillation signal to down-convert signals within the first IF frequency-range to signals within the second IF frequency-range. Operation 502 may also include dividing a second-loop VCO oscillation frequency by an integer-and-a-half value to generate a second-loop feedback signal. Operation 502 may also include multiplying the second-loop VCO oscillation frequency by a predetermined integer value to generate the fixed second oscillation signal.

Operation 502 may also include generating the stepped third oscillation signals in steps of a second predetermined increment to down-convert signals within the second IF frequency-range to signals within the third IF frequency-range. Operation 502 may also include dividing the stepped third oscillation signals by a predetermined integer value to generate a third-loop feedback signal. Operation 502 may also include dividing the master reference signal in response to third-loop step commands to generate a stepped reference signal. The stepped reference signal may be used in generating the stepped third oscillation signals.

Although the individual operations of procedure 500 are illustrated and described as separate operations, one or more of the individual operations may be performed concurrently and nothing requires that the operations be performed in the order illustrated.

Thus, an improved wideband receiver and method have been described. A wideband receiver and method that may be smaller, less-bulky and/or lighter than a conventional wideband receiver have also been described. A wideband receiver and method that may be more suitable for applications with size, space and/or weight limitations have also been described. A wideband receiver and method in which the image frequency is far outside the receive-frequency range have also been described. A wideband receiver and method with reduced improper and/or false signal detection have also been described. A high-resolution wideband receiver and method which may receive signals over a 2 to 20 GHz range with a 10 Hz resolution have also been described.

It is emphasized that the Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter lies in less than all features of a single disclosed embodiment. Thus the following claims are hereby incorporated into the detailed description, with each claim standing on its own as a separate preferred embodiment.

What is claimed is:

1. A receiver system for identifying unknown signals comprising:
    an intelligent-preselector stage comprising a plurality of half-octave filters and a plurality of up-converting elements, each half-octave filter covering at least approximately a half-octave portion of a 2 to 20 GHz receive-frequency range, the up-converting elements selectable to upconvert signals within different portions of the receive-frequency range;
    a signal identifier to identify a signal within the receive-frequency range based on coupled outputs of the half-octave filters;
    a controller to provide a select command to an RF switch to selectively provide stepped first oscillation signals to one of the up-converting elements based on a frequency of the identified signal to up-convert the identified signal to within a first IF frequency-range;
    a first down-converting stage to down-convert the upconverted signal to a signal within a second IF frequency-range with a fixed second oscillation signal;
    a second down-converting stage to down-convert the downconverted signal from within the second IF frequency-range to a signal within a third IF frequency-range with stepped third oscillation signals; and
    a synthesizer to generate the first, second and third oscillation signals by dividing on a master reference signal with half-integer frequency dividers.

2. The receiver system of claim 1 wherein a center frequency of the first IF frequency-range is at least approximately 30% to 35% higher than a highest frequency in the receive-frequency range, and
    wherein a frequency range of the stepped first oscillation signals provide an image frequency generated by a selected one of the up-converting elements outside at least one the half-octave filters that covers the portion of the receive-frequency range unconverted to the first IF frequency-range.

3. The receive of claim 2 wherein the plurality of half-octave filters form a filter bank, and,
    wherein the stepped third oscillation signals are stepped in approximately 10 Hz increments to provide up to a 10 Hz resolution.

4. The receiver system of claim 3 wherein at least some of the half-octave filters comprise printed resonant filters and at least some others of the half-octave filters comprise lumped element filters.

5. The receiver system of claim 3 wherein each up-converting element is selectable to up-convert a portion of the receive-frequency range with the stepped first oscillation signals.

6. The receiver system of claim 5 wherein:
    the RF switching element is selectable to switch the stepped first oscillation signals among the plurality of up-converting elements in response to the select command;
    the select command selects at least some of the half-octave filters;
    the synthesizer generates the stepped first oscillation signals in steps of a first increment to allow a selected one of the up-converting elements to up-convert signals in the receive-frequency range to within the first IF frequency-range; and
    the first IF frequency-range has a first bandwidth approximately equal to the first increment.

7. The receiver system of claim 6 wherein the up-converting elements comprise broadband mixers, and
    wherein the RF switching element comprises at least one of either field-effect transistor (FET) switching elements, PIN-diode switching elements or MEMS switching elements.

8. The receiver system of claim 6 wherein the intelligent-preselector stage further comprises:
    a combining element to combine outputs from the up-converting elements;
    pre-amplifiers to amplify signals in the receive-frequency range for the up-converting elements;
    an output amplifier to amplify at least signals within the first IF frequency-range generated by the up-converting elements; and a first IF filter to receive output signals from the output amplifier, the first IF filter having approximately the first bandwidth and to pass at least the first IF frequency-range.

9. The receiver system of claim 1 wherein the controller is to:
provide the select command to the intelligent-preselector stage to select among the plurality of up-converting elements and to select among the plurality of half-octave filters based on the frequency of the identified signal;
provide first-loop step commands to the synthesizer, the synthesizer responsive to the first-loop step commands to generate the stepped first oscillation signals in steps of a first increment; and
provide third-loop step commands to the synthesizer, the synthesizer responsive to the third-loop step commands to generate the stepped third oscillation signals in steps of a second increment.

10. The receiver system of claim 9 wherein the signal identifier instructs the system controller to provide the select command, provide the first-loop step commands and provide the third loop step commands to convert the identified signal to a signal within the third IF frequency-range.

11. The receiver system of claim 1 wherein the synthesizer comprises:
a reference unit to generate the master reference signal;
a first phase-locked loop to generate the stepped first oscillation signals based on the master reference signal;
a second phase-locked loop to generate the fixed second oscillation signal based on the master reference signal; and
a third phase-locked loop to generate the stepped third oscillation signals based on the master reference signal.

12. The receiver system of claim 11 wherein the first phase-locked loop generates the stepped first oscillation signals in steps of a first inclement to allow the intelligent-preselector stage to up-convert signals within the receive-frequency range to signals within the first IF frequency-range, and wherein the first if frequency-range has a first bandwidth of approximately the first increment.

13. The receiver system of claim 12 wherein the first phase-locked loop comprises:
a first-loop frequency divider to divide a first-loop VCO oscillation frequency by a value to generate a first-loop feedback signal, the value being in half-integer increments; and
a first-loop frequency multiplier to multiply the first-loop VCO oscillation frequency by a predetermined integer value to generate the stepped first oscillation signals.

14. The receiver system of claim 13 wherein the first phase-locked loop further comprises:
a first-loop VCO to generate the first-loop VCO oscillation frequency in response to a first-loop VCO control signal; and
a first-loop phase detector to compare the master reference signal with the first-loop feedback signal and generate the first-loop VCO control signal,
wherein the value in half-integer increments is selected in response to fast-loop step commands provided by a system controller.

15. The receiver system of claim 11 wherein the second phase-looked loop generates the fixed second oscillation signal to allow the first down-converting stage to down-convert signals within the first IF frequency-range to signals within the second IF frequency-range, the first and second IF frequency-ranges having a first bandwidth.

16. The receiver system of claim 15 wherein the second phase-locked loop comprises:
a second-loop frequency divider to divide a second-loop VCO oscillation frequency by an integer-and-a-half value to generate a second-loop feedback signal; and
a second-loop frequency multiplier to multiply the second-loop VCO oscillation frequency by a predetermined integer value to generate the fixed second oscillation signal.

17. The receiver system of claim 16 wherein the second phase-locked loop further comprises:
a second-loop VCO to generate the second-loop VCO oscillation frequency in response to a second-loop VCO control signal; and
a second-loop phase detector to compare the master reference signal with the second-loop feedback signal and generate the second-loop VCO control signal.

18. The receiver system of claim 11 wherein the third phase-locked loop generates the stepped third oscillation signals in steps of a second predetermined increment to allow the second down-converting stage to down-convert signals within the second if frequency-range to signals within the third IF frequency-range, the second if frequency-range having a first bandwidth, the third IF frequency having a second bandwidth.

19. The receiver system of claim 18 wherein the third phase-locked loop is a direct-digital synthesis (DDS) phase-locked loop and comprises:
a third-loop frequency divider to divide the stepped third oscillation signals by a predetermined integer value to generate a third-loop feedback signal; and
a programmable divider element to divide the master reference signal in response to third-loop step commands provided by a system controller to generate a stepped reference signal, the stepped reference signal to allow the third phase-locked loop to generate the stepped third oscillation signals.

20. The receiver system of claim 19 wherein the third phase-locked loop further comprises:
a third-loop VCO to generate the stepped third oscillation signals in response to a third-loop VCO control signal; and
a third-loop phase detector to compare the stepped reference signal with the third-loop feedback signal and generate the third-loop VCO control signal.

21. The receiver system of claim 1 wherein the first down-convening stage comprises:
a second if mixing element to down-convert signals within the first IF frequency-range to signals within the second IF frequency-range with the fixed second oscillation signal, the first and second IF frequency-ranges having a first bandwidth; and
a second IF filter having approximately the first bandwidth to at least pass signals within the second IF frequency-range provided by the second IF mixing element.

22. The receiver system of claim 21 wherein the second down-converting stage comprises:
a third IF mixing element to down-convert signals within the second IF frequency-range to signals within the third if frequency-range with the stepped third oscillation signals, the third IF frequency-range having a second bandwidth; and
a third IF filter to at least pass signals within the third if frequency-range provided by the third IF mixing element.

23. The receiver system of claim 1 wherein:
the stepped first oscillation signals range from approximately 6 to 24 GHz and are provided by the synthesizer in steps of approximately 0.5 GHz increments;
the first IF frequency-range has a center frequency of approximately 26 GHz and has a first bandwidth of approximately 0.5 GHz;
the fixed second oscillation signal is approximately 24.5 GHz;
the second IF frequency-range has a center frequency of approximately 1.5 GHz and has the first bandwidth; and
the stepped third oscillator signals range from approximately 0.75 GHz to 1.25 GHz and are provided by the synthesizer in steps of approximately 10 Hz increments; and
the third IF frequency-range ranges from approximately 0.250 and 0.750 GHz and is provided by the second down-converting stage in the steps of approximately 10 Hz increments.

24. A method of identifying unknown signals comprising:
identifying a signal within a 2 to 20 GHz receive-frequency range based on coupled outputs from a plurality of half-octave filters, each half-octave filter covering at least approximately half-octave portions of the receive-frequency range;
providing a select command to an RF switch to selectively provide stepped first oscillation signals to one of a plurality of up-converting elements based on a frequency of the identified signal to up-convert the identified signal;
up-converting signals received within a half-octave portion of the receive-frequency range associated with the identified signal to a first IF frequency-range with the stepped first oscillation signals,
down-converting signals within the first IF frequency-range to signals within a second IF frequency-range with a fixed second oscillation signal;
down-converting the signals within the second IF frequency-range to signals within a third IF frequency-range with stepped third oscillation signals; and
stepping the third oscillation signals in approximately 10 Hz increments to provide up to a 10 Hz resolution.

25. The method of claim 24 wherein a frequency range of the stepped first oscillation signals provide an image frequency generated by a selected one of the up-converting elements outside at least one the half-octave filters that covers the portion of the receive-frequency range unconverted to the first IF frequency-range.

26. The method of claim 25 further comprising:
instructing a system controller to provide the select command to select one of the up-converting elements, to provide first-loop step commands and to provide third loop step commands to convert the identified signal to the third IF frequency-range.

27. The method of claim 26 further comprising:
generating the stepped first oscillation signals in steps of a first increment to up-convert signals in the receive-frequency range to the first IF frequency-range, and wherein the first IF frequency-range has a first bandwidth of approximately the first increment;
dividing a first-loop VCO oscillation frequency by a value to generate a first-loop feedback signal, the value being in half-integer increments; and
multiplying the first-loop VCO oscillation frequency by a predetermined integer value to generate the stepped first oscillation signals.

28. The method of claim 25 further comprising:
generating the fixed second oscillation, signal to down-convert signals within the first bandwidth of the first IF frequency-range to signals within the first bandwidth of the second IF frequency-range;
dividing a second-loop VCO oscillation frequency by an integer-and-a-half value to generate a second-loop feedback signal; and
multiplying the second-loop VCO oscillation frequency by a predetermined integer value to generate the fixed second oscillation signal.

29. The method of claim 25 further comprising:
generating the stepped third oscillation signals in steps of a second predetermined increment to down-convert signals within a first bandwidth of the second IF frequency-range to signals within a second bandwidth of the third IF frequency-range;
dividing the stepped third oscillation signals by a predetermined integer value to generate a third-loop feedback signal; and
dividing a master reference signal in response to third-loop step commands to generate a stepped reference signal, the stepped reference signal for use in generating the stepped third oscillation signals.

30. A wideband receiver system for identifying unknown signals comprising:
an intelligent-preselector stage comprising a plurality of half-octave filters and a plurality of up-converting elements, each half octave filter covering at least approximately a half-octave portion of a 2 to 20 GHz receive-frequency range, the up-converting elements selectable to up-convert received signals within different portions of the receive-frequency range to signals within a first IF frequency-range with stepped first oscillation signals;
a signal identifier to identify a signal within the receive-frequency range based on coupled outputs of the half-octave filters;
a controller to provide a select command to an RF switch to selectively provide the stepped first oscillation signals to one of the up-converting elements based on a frequency of the identified signal to up-convert the identified signal within the first IF frequency-range; and
a synthesizer comprising a first phase-locked loop to generate the stepped first oscillation signals by dividing the master reference signal in half-integer increments, a second phase-locked loop to generate a fixed second oscillation signal by dividing the master reference signal by an integer-and-a-half value, and a third phase-locked loop to generate a stepped third oscillation signals by dividing the master reference signal in half integer increments,
wherein the third oscillation signals are stepped in increments no greater than 10 Hz to provide up to a 10 Hz resolution.

31. The receiver of claim 30 further comprising:
a first down-converting stage to down-convert the signals within the first IF frequency-range to signals within a second IF frequency-range with the fixed second oscillation signal; and
a second down-converting stage to down-convert the signals within the second IF frequency-range to signals within the third IF frequency-range with stepped third oscillation signals,
wherein the intelligent-preselector stage up-converts received signals within a receive-frequency range, and wherein a center frequency of the first IF frequency-range is at least approximately 30% to 35% higher than a highest frequency in the receive-frequency range, and wherein a frequency range of the stepped first oscillation signals provide an image frequency generated by a selected one of the up-converting elements outside at least one the half-octave filters that covers the portion of the receive-frequency range upconverted to the first IF frequency-range.

32. The receiver of claim 31 wherein the plurality of half-octave filters to form a filter bank, wherein the first phase-locked loop comprises a first-loop frequency divider to divide a first-loop VCO oscillation frequency by a value to generate a first-loop feedback signal, the value being in half-integer increments, and a first-loop frequency multiplier to multiply the first-loop VCO oscillation frequency by a predetermined integer value to generate the stepped first oscillation signals, wherein the second phase-locked loop comprises a second-loop frequency divider to divide a second-loop VCO oscillation frequency by an integer-and-a-half value to generate a second-loop feedback signal, and a second-loop frequency multiplier to multiply the second-loop VCO oscillation frequency by a predetermined integer value to generate the fixed second oscillation signal, and wherein the third phase-locked loop comprises a third-loop frequency divider to divide the stepped third oscillation signals by a predetermined integer value to generate a third-loop feedback signal, and a programmable divider element to divide the master reference signal in response to third-loop step commands provided by a system controller to generate a stepped reference signal, the stepped reference signal to allow the third phase-locked loop to generate the stepped third oscillation signals.

33. The receiver of claim 32 wherein the controller:

provides the select command to the intelligent-preselector stage to select among the half-octave filters based on a frequency of the stepped first oscillation signals;

provides first-loop step commands to the synthesizer, the synthesizer responsive to the first-loop step commands to generate the stepped first oscillation signals in steps of a first increment; and provides third-loop step commands to the synthesizer, the synthesizer responsive to the third-loop step commands to generate the stepped third oscillation signals in steps of a high-resolution second increment of no greater than 10 Hz.

* * * * *